United States Patent
Joyce et al.

(10) Patent No.: US 11,128,654 B1
(45) Date of Patent: Sep. 21, 2021

(54) SYSTEMS AND METHODS FOR UNIFIED HIERARCHICAL CYBERSECURITY

(71) Applicant: ARCHITECTURE TECHNOLOGY CORPORATION, Eden Prairie, MN (US)

(72) Inventors: Robert Joyce, Ithaca, NY (US); Scott Aloisio, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 312 days.

(21) Appl. No.: 16/267,304

(22) Filed: Feb. 4, 2019

(51) Int. Cl.
| H04L 9/00 | (2006.01) |
| H04L 29/06 | (2006.01) |
| G06F 16/835 | (2019.01) |
| G06F 16/955 | (2019.01) |

(52) U.S. Cl.
CPC ...... *H04L 63/1433* (2013.01); *G06F 16/8373* (2019.01); *G06F 16/955* (2019.01); *H04L 63/1416* (2013.01); *H04L 63/20* (2013.01)

(58) Field of Classification Search
CPC . H04L 63/20; H04L 63/1416; H04L 63/1433; G06F 16/955; G06F 16/8373
See application file for complete search history.

(56) References Cited

U.S. PATENT DOCUMENTS

| 5,115,433 A | 5/1992 | Baran et al. |
| 5,974,549 A | 10/1999 | Golan |
| 6,658,481 B1 | 12/2003 | Basso et al. |
| 6,985,476 B1 | 1/2006 | Elliott et al. |
| 7,317,733 B1 | 1/2008 | Olsson et al. |
| 7,496,959 B2 | 2/2009 | Adelstein et al. |

(Continued)

FOREIGN PATENT DOCUMENTS

| CN | 106709613 A | 5/2017 |
| WO | WO-2017/105383 A1 | 6/2017 |

OTHER PUBLICATIONS

"Cybersecurity," U.S. Department of Defense Instruction, No. 8500_01, accessible via.https://www.esd_whs.mil/ Portals/54/Documents/D D/issuances/dodi/850001 _ 2014 _ pdf, Mar. 14, 2014, 58 pages.

(Continued)

*Primary Examiner* — Beemnet W Dada
(74) *Attorney, Agent, or Firm* — Foley & Lardner LLP

(57) ABSTRACT

Disclosed herein are embodiments of systems, methods, and products comprise an analytic server, which improves the cybersecurity of a unified system comprising a plurality of sub-systems. The analytic server may instantiate a sub attack tree for each network sub-system within the unified system of distributed network infrastructure. The analytic server may access the sub attack trees of the network sub-systems based on the corresponding identifiers. The analytic server may build a high-level attack tree of the unified system by aggregating the sub attack tree of each sub-system. The analytic server may determine how the interconnection of the plurality of network sub-systems may affect the unified system security. The analytic server may update one or more nodes of the attack tree to reflect the changes produced from the interconnection. The analytic server may build the attack tree based on a set of aggregation rules.

20 Claims, 6 Drawing Sheets

(56) References Cited

U.S. PATENT DOCUMENTS

| | | | |
|---|---|---|---|
| 7,818,804 B2 | 10/2010 | Marceau | |
| 7,962,961 B1 | 6/2011 | Griffin et al. | |
| 8,156,483 B2 | 4/2012 | Berg et al. | |
| 8,296,848 B1 | 10/2012 | Griffin et al. | |
| 8,458,805 B2 | 6/2013 | Adelstein et al. | |
| 8,499,354 B1 | 7/2013 | Satish et al. | |
| 8,862,803 B2 | 10/2014 | Powers et al. | |
| 8,893,278 B1 | 11/2014 | Chechik | |
| 9,076,342 B2 | 7/2015 | Brueckner et al. | |
| 9,081,911 B2 | 7/2015 | Powers et al. | |
| 9,083,741 B2 | 7/2015 | Powers | |
| 9,137,325 B2 | 9/2015 | Muhunthan et al. | |
| 9,225,637 B2 | 12/2015 | Ramanujan et al. | |
| 9,384,677 B2 | 7/2016 | Brueckner et al. | |
| 9,882,912 B2 | 1/2018 | Joo | |
| 10,291,634 B2 * | 5/2019 | Arzi | H04L 63/1408 |
| 10,540,502 B1 | 1/2020 | Joyce et al. | |
| 10,558,809 B1 | 2/2020 | Joyce et al. | |
| 10,749,890 B1 * | 8/2020 | Aloisio | G06N 5/003 |
| 2005/0138413 A1 * | 6/2005 | Lippmann | G06F 21/577 726/4 |
| 2010/0082513 A1 * | 4/2010 | Liu | G06N 20/00 706/46 |
| 2012/0210017 A1 | 8/2012 | Muhunthan et al. | |
| 2012/0210427 A1 | 8/2012 | Bronner et al. | |
| 2014/0337971 A1 | 11/2014 | Casassa Mont et al. | |
| 2015/0213260 A1 | 7/2015 | Park | |
| 2015/0339477 A1 | 11/2015 | Abrams et al. | |
| 2016/0099953 A1 | 4/2016 | Hebert et al. | |
| 2016/0173495 A1 | 6/2016 | Joo | |
| 2016/0188814 A1 | 6/2016 | Raghavan et al. | |
| 2016/0219024 A1 | 7/2016 | Verzun et al. | |
| 2016/0234242 A1 | 8/2016 | Knapp et al. | |
| 2016/0307199 A1 | 10/2016 | Patel et al. | |
| 2017/0171230 A1 * | 6/2017 | Leiderfarb | H04L 63/145 |
| 2018/0048534 A1 | 2/2018 | Banga et al. | |
| 2018/0121657 A1 | 5/2018 | Hay et al. | |
| 2018/0129805 A1 | 5/2018 | Samuel | |
| 2018/0159894 A1 | 6/2018 | Reddy et al. | |
| 2018/0191770 A1 | 7/2018 | Nachenberg et al. | |
| 2018/0225471 A1 | 8/2018 | Goyal et al. | |
| 2018/0367563 A1 * | 12/2018 | Pfleger de Aguiar | H04L 41/12 |
| 2019/0014153 A1 | 1/2019 | Lang et al. | |
| 2019/0102564 A1 | 4/2019 | Li et al. | |
| 2019/0164015 A1 | 5/2019 | Jones, Jr. et al. | |
| 2019/0188615 A1 | 6/2019 | Liu | |
| 2019/0258953 A1 | 8/2019 | Lang et al. | |

OTHER PUBLICATIONS

"Cyberspace Operations," U.S. Air Force, Air Force Policy Directive 10-17, accessible via https:/1as.org/irp/doddir/usaf/afpd10-17.pdf, Jul. 31, 2012, 9 pages.

"Impact of a DDoS attack on computer systems: An approach based on an attack tree model," 2018 Annual IEEE International Systems Conference (SysCon), Vancouver, BC, 2018, p. 1-8, 2018.

2015 DFRWS Forensics Challenge-Submitted Solutions and Source Code Released, Retrieved from http://www.cs.uno.edu/-golden/gpumalware-research.html, 5 pages.

ATC-NY, OSD172-D11, F172-D11-0024, Phase I SBIR Proposal, "SilverlineRT", Jul. 20, 2017, 16 pages.

Atighetchi et al., "Metrinome-Continuous Monitoring and Security Validation of Distributed Systems", Journal of Cyber Security and Information Systems, vol. II, No. 1, Knowledge Management, Mar. 2014, 7 pages.

Baloch et al., "Comparative Study of Risk Management in Centralized and Distributed Software Development Environment", Sci. Int.(Lahore), vol. 26, No. 4, 2014, 6 pages.

Balzarotti et al.,"The impact of GPU-assisted malware on memory forensics: A case study", DFRWS, 2015, 9 pages.

Becker et al., "Applying Game Theory to Analyze Attacks and Defenses in Virtual Coordinate Systems," 41st International Conference on Dependable Systems & Networks (DSN), Jun. 2011, 10 pages.

Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.

Crowley, Home Invasion 2.0, Attacking Network-Connected Embedded Devices, retrieved from the internet on Jun. 20, 2018, https://media.blackhat.com/us-13/US-13-Crowley-Home-Invasion-2-0-WP.pdf, 15 pages.

De Gusmao et al, "Abstract of Cybersecurity risk analysis model using fault tree analysis and fuzzy decision theory", 2018, International Journal of Information Management, pp. 1-3.

Edwards et al., Hajime: Analysis of a decentralized internet worm for IoT devices, RapidityNetworks, Security Research Group, Oct. 16, 2016, pp. 1-18.

Fisher, "Developing Software in a Multicore & Multiprocessor World," Klocwork.com., white paper, Sep. 2010, 11 pages.

Identification and Significance of the Problem or Opportunity, Architecture Technology Corporation, Proposal No. F172-D12-0184, Topic No. OSD172-D12, 10 pages.

Jones, "Software Defect Origins and Removal Methods," International Function Point Users Group, Dec. 28, 2012, 31 pages.

Joyce et al., "MEGA: A Tool for Mac OS X Operating System and Application Forensics," Proceedings of the Digital Forensic Research Conference, Aug. 11-13, 2008, 8 pages.

Joyce, "TrestleHSM: Hierarchical Security Modeling for Naval Control Systems", Phase 1 SBIR Proposal, Topic: N181-051, Unified Cybersecurity System Modeling of Naval Control Systems, 25 pages.

Libicki, "Cyberdeterrence and Cyberwar", Rand Corporation, 2009, 240 pages.

Maciel, et al. "Impact of a DDoS attack on computer systems: An approach based on an attack tree model," 2018 Annual IEEE International Systems Conference (SysCon), Vancouver, BC, 2018, pp. 1-8.

McHale, "The Aegis Combat System's continuous modernization", Military Embedded Systems, retrieved from http://mil-embedded.com/articles/the-aegis-combat-systems-continuous-modernization/, Aug. 26, 2016, 8 pages.

McLinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12.

Porche III et al., "A Cyberworm that Knows no Boundaries", RAND Corporation, 2011, 55 pages.

PR Newswire, "ATCorp Releases CSAS-Cloud Security Analysis Suite for Applications in the Cloud", Feb. 26, 2016, 4 pages.

Quinlan et al., "ROSE User Manual: A Tool for Building Source-to-Source Translators," Draft User Manual, Version D.9.6a, Lawrence Livermore National Laboratory, Dec. 16, 2015, 337 pages.

Rahman et al., "Defect Management Life Cycle Process for Software Quality Improvement," World Academy of Science, Engineering and Technology International Journal of Computer and Information Engineering, vol. 9, No. 12, Nov. 24, 2015, 4 pages.

Richard, "Memory Analysis, meet GPU Malware", Oct. 22, 2014,CERIAS, Retrieved from http://www.cerias.purdue.edu/news_and_events/ events/ security seminar/ details/index/popenihmencsf2v5mggg5ulfd4, 2 pages.

Robbio, "How Will AI Impact Software Development" Forbes Technology Council, Aug. 31, 2017, 16 pages.

ROSE: Main Page, Retrieved from http://rosecompiler.org/ROSE_HTML_Reference/, Mar. 29, 2017, 3 pages.

Salach et al.. "Comparative Study of Risk Management in Centralized and Distributed Software DevelopmentEnvironment", Sci. Int.(Lahore), vol. 26, No. 4, 1523-1528, 2014, 6 pages.

Schneier, "Attack Trees-Schneier on Security", Dr. Dobb's Journal, Dec. 1999, Retrieved from https://www.schneier.com/academic/archives/1999/12/attack_trees.html, 9 pages.

Shiva et al., "Game Theory for Cyber Security," Proceedings of the Sixth Annual Workshop on Cyber Security and Information Intelligence Research, Article No. 34, Apr. 2010, 10 pages.

Sirianni, "A19-080 Cyber Security Tool Kits for Engineers and Soldiers," Phase 1 SBIR Proposal, 24 pages.

(56) References Cited

OTHER PUBLICATIONS

Sironi et al., "Metronome: Operating System Level Performance Management via Self-Adaptive Computing," DAC 2012, Jun. 3-7, 2012, 10 pages.
Snyder et al., "Ensuring U.S. Air Force Operations During Cyber Attacks Against Combat Support Systems Guidance Where to Focus Mitigation Efforts," RAND Corporation, 2015, 37 pages.
Vasiliadis et al., "GPU-assisted malware", Int. J. Int Secur. 2015, Published, Aug. 28, 2014, 6 pages.
Wikipedia-OpenCL, Retrieved from https://en.wikipedia.org/wiki/OpenCL, Mar. 29, 2017, 23 pages.
Wu et al., "An Attack Modeling Based on Hierarchical Colored Petri Nets", 2008 International Conference on Computer and Electrical Engineering, Phuket, 2008, pp. 918-921.
Xu et al., "Attack identification for software-defined networking based on attack trees and extension innovation methods," 2017 9th IEEE Intl. Conf. on Intelligent Data Acquisition and Advanced Computing Systems: Technology and Applications (IDAACS), Bucharest, 2017, pp. 485-489.
ATC-NY, SB172-007, D172-007-0014, Phase I SBIR Proposal, Silverline Human Performance Detection (Silverline-HPD), Jul. 20, 2017, 17 pages.

\* cited by examiner

SYSTEMS AND METHODS FOR UNIFIED HIERARCHICAL CYBERSECURITY

CROSS-REFERENCE TO RELATED APPLICATIONS

This application relates to U.S. application Ser. No. 16/012,651, filed Jun. 19, 2018, titled "Systems and Methods for Improving the Ranking and Prioritization of Attack-Related Events," U.S. application Ser. No. 15/485,784, filed Apr. 12, 2017, titled "Software Assurance System for Runtime Environments," and U.S. application Ser. No. 15/622,434, filed Jun. 14, 2017, titled "Software Assurance for Heterogeneous Distributed Computing Systems," each of which is hereby incorporated by reference in its entirety.

TECHNICAL FIELD

This application relates generally to methods and systems for improving the cybersecurity of a unified system.

BACKGROUND

High-value military and civilian information technology (IT) and control systems face constant attack, and the impact of a significant comprise can be catastrophic. Compromise can be due to software bugs, configuration errors, or design flaws—all of which involve low-level technical details and are difficult to ascribe to high-level system services and mission needs. As systems grow and are aggregated, assessment complexity grows as roughly the square of the number of sub-systems (assuming the number of sub-systems is N), due to $N^2$ potential interconnections and interdependencies, as well as more organizations involved in management and maintenance. Further, system aggregation can create emergent risks that are not evident in a single sub-system but only arise upon interconnection.

Control systems within military as well as those that support civilian critical infrastructure, have become complex, software-heavy systems of systems under the stewardship of multiple cooperating parties. Assessing the cybersecurity risks and their impacts for those systems is equally complex, yet an adversary only needs to find the weakest link to jeopardize mission success.

The conventional system engineering tools are incomplete and fail to determine overall cybersecurity risks to unified systems. For example, conventional systems engineering tools have traditionally been focused on architecture, requirements analysis, and high-level concerns, but not cybersecurity. Existing security software, including static/dynamic analysis tools, configuration verification frameworks such as the NIST (National Institute of Standards and Technology) Security Content Automation Protocol (SCAP) and DISA (Defense Information Systems Agency) Security Technical Implementation Guides (STIGs), and reports from assessment systems such as Tenable's Nessus/ACAS (Assured Compliance Assessment Solution) provide detailed information but little insight into overall system security. Traditional SCAP and STIG content also focuses on traditional desktop and server platforms; it may not apply to all control systems.

As such, a significant improvement upon cybersecurity systems is desired.

SUMMARY

What is therefore desired is to have a system that builds cybersecurity models that analyze and prioritize the impact of security alerts and security-relevant events on servers, endpoint hosts, and network devices.

Embodiments disclosed herein describe a software tool or a security application for building system-wide, cybersecurity models (e.g., attack trees) in a distributed, hierarchical format. An analytic server running the security application may build hierarchical security modeling and automated assessment tool, such as an attack tree. Specifically, the analytic server may instantiate a sub attack tree for each network sub-system within a unified system of distributed network infrastructure. The analytic server may access the sub attack trees of the network sub-systems based on the corresponding identifiers. The analytic server may build a high-level attack tree of the unified system by aggregating the sub attack tree of each sub-system. The analytic server may determine how the interconnection of the plurality of network sub-systems may affect the unified system security. The analytic server may build the attack tree based on a set of aggregation rules. Furthermore, the analytic server may import and parse system architecture description files to produce a partial or a complete attack tree.

The analytic server running the security application may surface and prioritize high-level cybersecurity risks, saving time for system analysts while providing visibility across enclaves. The hierarchical model may allow local domain experts to generate artifacts for the portion of the system corresponding to each local domain expert, and may aggregate the expert models in order to compute overall metrics. As systems and threats evolve, the analytic server may highlight the impact of newly-discovered vulnerabilities on mission cybersecurity. When metrics such as remediation costs are part of the model, the security application may help the decision maker prioritize limited resources for maximum impact on mission success. The security application may apply to military and civilian critical infrastructure, transportation, and other sectors employing systems-of-systems for process control or IT services.

In one embodiment, a computer-implemented method comprises instantiating, by a computer, a first sub attack tree with a first set of parameterized references associated with a first network sub-system in a distributed network infrastructure; instantiating, by the computer, a second sub attack tree with a second set of parameterized references associated with a second network sub-system in the distributed network infrastructure, the computer instantiating the first and second sub attack trees based on a sub attack tree template; generating, by a computer, a machine readable markup file of an attack tree of the distributed network infrastructure containing a plurality of network sub-systems including the first and second network sub-systems, the attack tree containing the first and second sub attack trees, and the markup file containing identifiers of the plurality of network sub-systems including a first identifier of the first network sub-system and a second identifier of the second network sub-system; retrieving, by the computer at runtime, the first identifier and the second identifier from the machine readable markup file; querying, by the computer at runtime, the first sub attack tree using the first identifier and the first set of parameterized references and the second sub attack tree using the second identifier and the second set of parameterized references; in response to the computer determining based upon the query that one or more security attributes of at least one of the first and second sub attack trees have changed: automatically updating, by the computer, at least one node in the attack tree hierarchically above the first and the second sub attack trees; and displaying, by the computer, the updated attack tree in a dashboard graphical user interface.

In another embodiment, a system comprises a non-transitory storage medium storing a plurality of computer program instructions; and a processor electrically coupled to the non-transitory storage medium and configured to execute the plurality of computer program instructions to: instantiate a first sub attack tree with a first set of parameterized references associated with a first network sub-system in a distributed network infrastructure; instantiate a second sub attack tree with a second set of parameterized references associated with a second network sub-system in the distributed network infrastructure, the computer instantiating the first and second sub attack trees based on a sub attack tree template; generate a machine readable markup file of an attack tree of the distributed network infrastructure containing a plurality of network sub-systems including the first and second network sub-systems, the attack tree containing the first and second sub attack trees, and the markup file containing identifiers of the plurality of network sub-systems including a first identifier of the first network sub-system and a second identifier of the second network sub-system; retrieve, at runtime, the first identifier and the second identifier from the machine readable markup file; query, at runtime, the first sub attack tree using the first identifier and the first set of parameterized references and the second sub attack tree using the second identifier and the second set of parameterized references; in response to the processor determining based upon the query that one or more security attributes of at least one of the first and second sub attack trees have changed: automatically update at least one node in the attack tree hierarchically above the first and the second sub attack trees; and display the updated attack tree in a dashboard graphical user interface.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
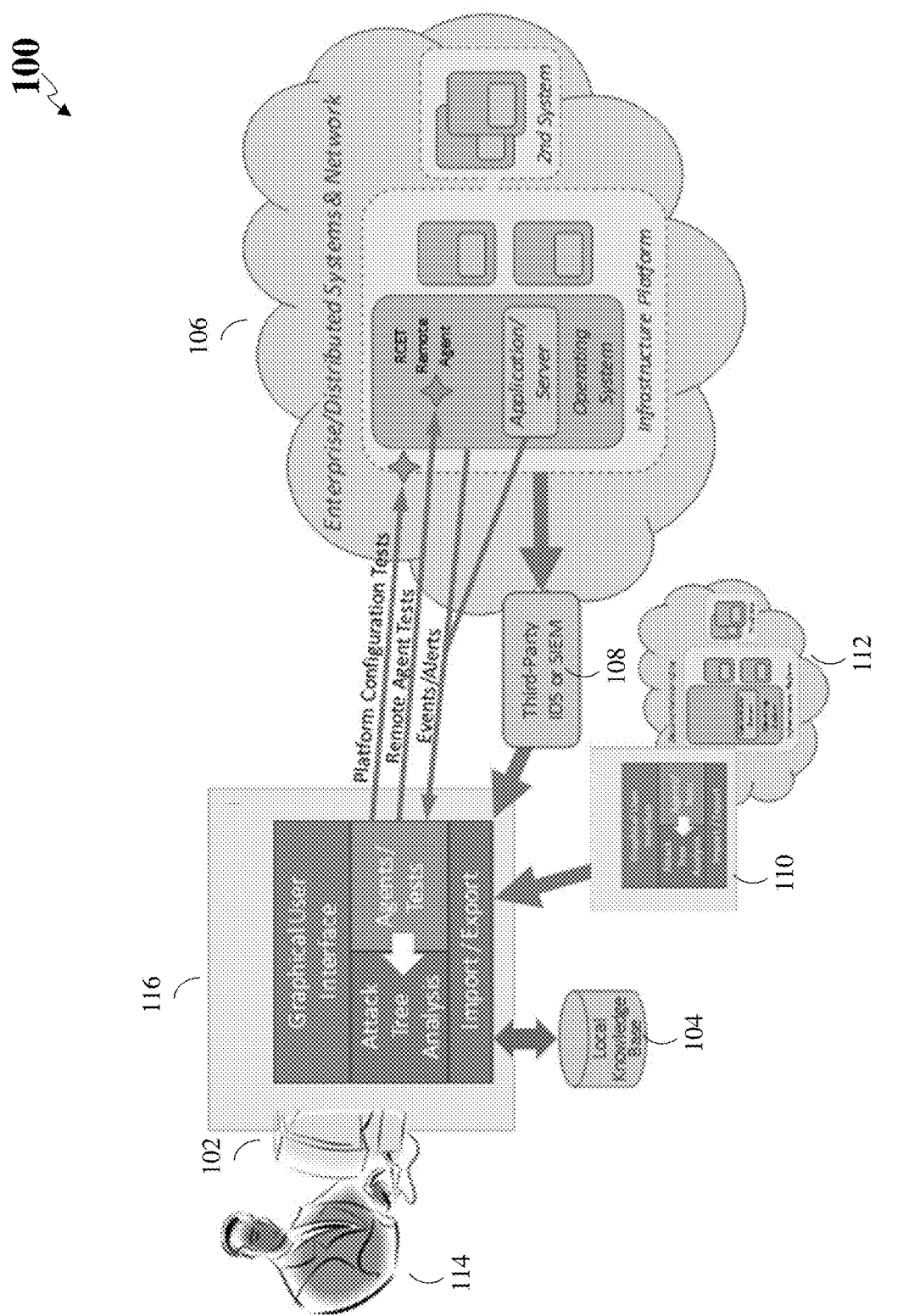
FIG. 1 illustrates a computer system for improving the cybersecurity of a unified system, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an analytic server running a security application. The security application may comprise a hierarchical security modeling tool that provides for delegation of modeling responsibilities as well as automated testing and computation of aggregate security-relevant metrics. An analytic server running the security application may model risks using attack tree concepts and constructive hierarchical models, with structural enhancements to better describe risks to complex distributed systems, which often have many similarly-configured machines and interconnects. An attack tree (or attack tree model) may illustrate how vulnerabilities can be exploited to achieve an attacker's possible aims.

The analytic server running the security application may extend the attack tree concept to address large scale systems with delegated management among multiple stakeholders. Such enhancements may allow the security application to be useful even when specific sub-system trees are incomplete or low in fidelity; the analytic server may still see the impacts of broadly-described risks in those sub-systems. The analytic server may also enhance the attack tree concept with parameterized references, allowing domain experts to create templates that are instantiated multiple times to fit different needs within a system model. The analytic server may generate an attack tree by importing design-time artifacts (such as an interconnection model) and connecting the design-time artifacts to templated sub-trees—potentially managed by other organizations.

The security application may have the interoperability with existing system engineering artifacts, as well as the ability to generate data needed for Risk Management Framework (RMF) analysis. The security application's hierarchical models may allow incremental adoption and incremental increases in model fidelity, starting from top-level concerns such as "100% system availability" and working down to automated conformance tests for individual components.

The security application's hierarchical models may interoperate with (and import) established guidance, such as NIST Special Publication 800-53 and DISA STIGs, which have a similar tree structure and can be incorporated as pieces within a larger model. The analytic server running the security application may perform automated evaluations and computations over the attack tree models, testing on-line to see whether particular vulnerabilities are present or known-weak configurations or libraries are in use, and computing metrics, impacts, and costs based on component metrics. The security application's automated evaluations may make use of NIST SCAP standards, such as the Open Vulnerability and Assessment Language (OVAL), Common Weakness Enumeration (CWE), and the Common Vulnerabilities and Exposures (CVE) database. In addition to SCAP-based testing, the analytic server may also execute commands directly on the distributed system's nodes using Secure Shell (SSH) and use management APIs for cloud/cluster system infrastructures such as OpenStack, Amazon Web Services, and HTCondor. The analytic server may analyze and summarize results in a dashboard-like format that allows the user to pinpoint critical risks and the most cost-effective means to address them.

FIG. 1 illustrates components of a system 100 for improving the cybersecurity of a unified system, according to an embodiment. The system 100 may include an analytic server 102 with a local knowledge database 104, enterprise/distributed systems and network 106, a third party intrusion detection system (IDS) or security information and event management (SIEM) system 108, a second analytic server 110 connected with a second network of distributed systems 112. FIG. 1 shows how a system fits within a multi-site real-time monitoring system. The analytic server and other system devices may be connected via hardware and software components of one or more networks. Examples of the network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The analytic server 102 may be any computing device comprising a processor and other computing hardware and software components, configured to build a security system containing one or more security applications. The analytic server 102 may be logically and physically organized within the same or different devices or structures, and may be distributed across any number of physical structures and locations (e.g., cabinets, rooms, buildings, cities). The analytic server 102 may execute automated configuration and run-time status queries. At the same time, the analytic server 102 may receive logging and alert information from the servers, endpoints, and network devices under management. For example, the analytic server 102 may receive logging and alert information from the devices in the enterprise/distributed systems and network 106, the second analytic server 110 connected with the second network of distributed systems 112. The analytic server 102 may also query existing IDS and SIEM systems for alert data, and receive such data asynchronously from the third party IDS or SIEM 108. The logging and alert information collected on each device may be collected via standard protocols such as syslog, Windows Event Logs, secure shell (SSH), or the Simple Network Management Protocol (SNMP). The OASIS® Structured Threat Information eXpression (STIX) is a natural way of describing the logging and alert data and is supported in the security system via the OASIS Trusted Automated Exchange of Intelligence Information (TAXII) transport. In this way, the security system may leverage future/third-party advances in detection algorithms.

The analytic server 102 may build a security application 116 by using an attack tree model based on a set of aggregation rules, which dictate how various metrics are computed in terms of lower-level data. In the security application 116, the analytic server 102 may support a large set of aggregation functions, and the user can define custom functions if needed. The analytic server 102 may refine the interface for aggregation functions and provide a set of aggregators specific to assessing real-time cyber threat indicator data. The results of the aggregation rules can be in standard form such as National Institute of Standards and Technology (NIST) Common Vulnerability Scoring System (CVSS) vectors or costs, or in mission domain-specific terms. As data arrives, the metrics will be recomputed in real-time, "bubbling up" the tree as appropriate.

After the analytic server 102 prioritizes and analyzes the aggregate impact of multiple alters, IDS notifications, and other attack indicators, the analytic server 102 may display the results on a user interface of the analytic server or on a computing device (not shown) associated with the analyst 114. The analyst 114 may easily see which alerts have the most significant "big picture" impact and which can be triaged for later assessment by low-level personnel. When cost or other metrics are available within the model, the analyst 114 may see which proposed remediation strategies have the most significant impact for the least cost or least mission disruption.

The analytic server 102 may operate the security application 116 in a federal manner, where portions of the tree model located at various sites or administrative domains and are maintained by local experts. At alternate sites, headless copies of security applications aggregate site-local data and alerts; the results may provide aggregated inputs to one or more "master" instances for analyst use. Such an architecture may allow for voluminous, potentially sensitive alert and IDS data to stay local (e.g., for forensic purposes) while enabling the entire system to scale up for very large enterprises.

Overall, the analytic server 102 may use the security application 116 to help the analyst 114 sort out false alarms from true attacks that have minimal impact on mission success, and highlight the attacks that must be addressed immediately and possibly automatically. Therefore, the analytic server 102 may save time and reduce cognitive burden on overloaded security analysts.

The security application 116 built by the analytic server 102 may include several components or modules, such as an import/export module, an attack tree analysis module, an agent tests module, a graphical user interface module. The import/export module may receive data from or transmit data to local knowledge database 104. The import/export module may also receive logging and alert information from devices under management, such as the servers, endpoints, and network devices in the distributed systems and network 106 through a third-party IDS or SIEM 108. The agent testes module may receive events and alerts from the operating system of the infrastructure platform within the enterprise/distributed systems and network 106 or applications and servers within the operating system. In addition, the agent tests module may perform configuration tests and remote agent tests on the operating system of the infrastructure platform within the enterprise/distributed systems and network 106. The agent tests module may interact with the attack tree analysis module to determine and analyze the security attacks. The attack tree module may comprise a set of aggregation rules for computing various metrics on threats and possible attacks on different devices. The graphical user interface module may comprise graphical interactive elements configured to display analysis results and cyber threat indicator data, receive user configuration, and any other interactive elements that allow the user to interact with the analytic server 102.

The local knowledge database 104 may be any non-transitory machine-readable media associated with the analytic server 102. The local knowledge database 104 may be configured to store data, including logging and alert information from different devices and systems, the attack tree model comprising aggregation rules and configurations for analyzing security threats and attacks, the metrics computed based on the aggregation rules in the attack tree model, the ranking and prioritization of attack-related events. The local knowledge database 104 may also include any other data that is helpful for analyzing security alerts and server/endpoint/network events.

The enterprise/distributed systems and network 106 may be any number of devices and systems connected with each other within a distributed network. Such devices and systems may be under management of the analytic server 102. The enterprise/distributed systems and network 106 may comprise infrastructure platform with operating system for servers and applications. The operating system may receive remote agent tests from the analytic server 102. The infrastructure platform of one system may be connected to another system (e.g., a second system). The infrastructure platform of each system may transmit logging and alert information to the analytic server 102 via a third-party IDS or SIEM 108.

The enterprise/distributed systems and network 106 may be a unified system comprising a plurality of network sub-systems. The analytic server 102 may manage the security of the unified system 106 based on an attack tree. The analytic server 102 may build a high-level attack tree of the unified system by aggregating the sub attack trees of the sub-systems. Specifically, the analytic server may instantiate a sub attack tree for each network sub-system within the distributed network infrastructure 106. The analytic server 102 may determine how the interconnection of the plurality of network sub-systems may affect the unified system security. The analytic server 102 may build the attack tree based on a set of aggregation rules. The attack tree of the unified system may make reference to sub attack trees of the plurality of sub-systems. The analytic server 102 may refer to the sub attack trees as files or via URL (Uniform Resource Locator) or URI (Uniform Resource Identifier). For example, when the analytic server 102 traverses the attack tree of the unified system, the analytic server 102 may reach a portion of the attack tree that is a reference to a sub attack tree of a network sub-system. The reference may be a URL or URI. The analytic server 102 may access or refer to the sub attack tree based on the identifier (e.g., URL or URI) in runtime. The analytic server 102 may generate a machine-readable markup file of an attack tree to store the identifiers of the plurality of network sub-systems. Furthermore, the analytic server 102 may generate a set of parameters (e.g. parameterized references) based on security analysis from the traversing the attack tree, while refer to the sub attack tree. When the analytic server 102 refers to the sub attack tree, the analytic server 102 may transmit the set of parameters to the sub attack tree. Sequentially, the sub attack tree may execute the logic for detecting attacks based on the set of parameters.

The third-party IDS or STEM 108 may be any device or software application that monitors a network or systems for malicious activity or policy violations. The STEM system may report any malicious activity or violation to an administrator or analyst. The SIEM may combine outputs from multiple sources. The third-party IDS or SIEM 108 may plug in the existing systems, aggregate the alerts and events from various systems and devices and import the alerts and events into the security application 116 running on the analytic server 102.

The second analytic server 110 connected with the second network of distributed systems 112 may be a similar system architecture as the analytic server 102 connected with the enterprise/distributed systems and network 106. The different analytic servers may be in communication with each other and feed alerts and events information into each other. The system 100 may comprise any number of such analytic servers and connected networks of distributed systems.

Figure 2:
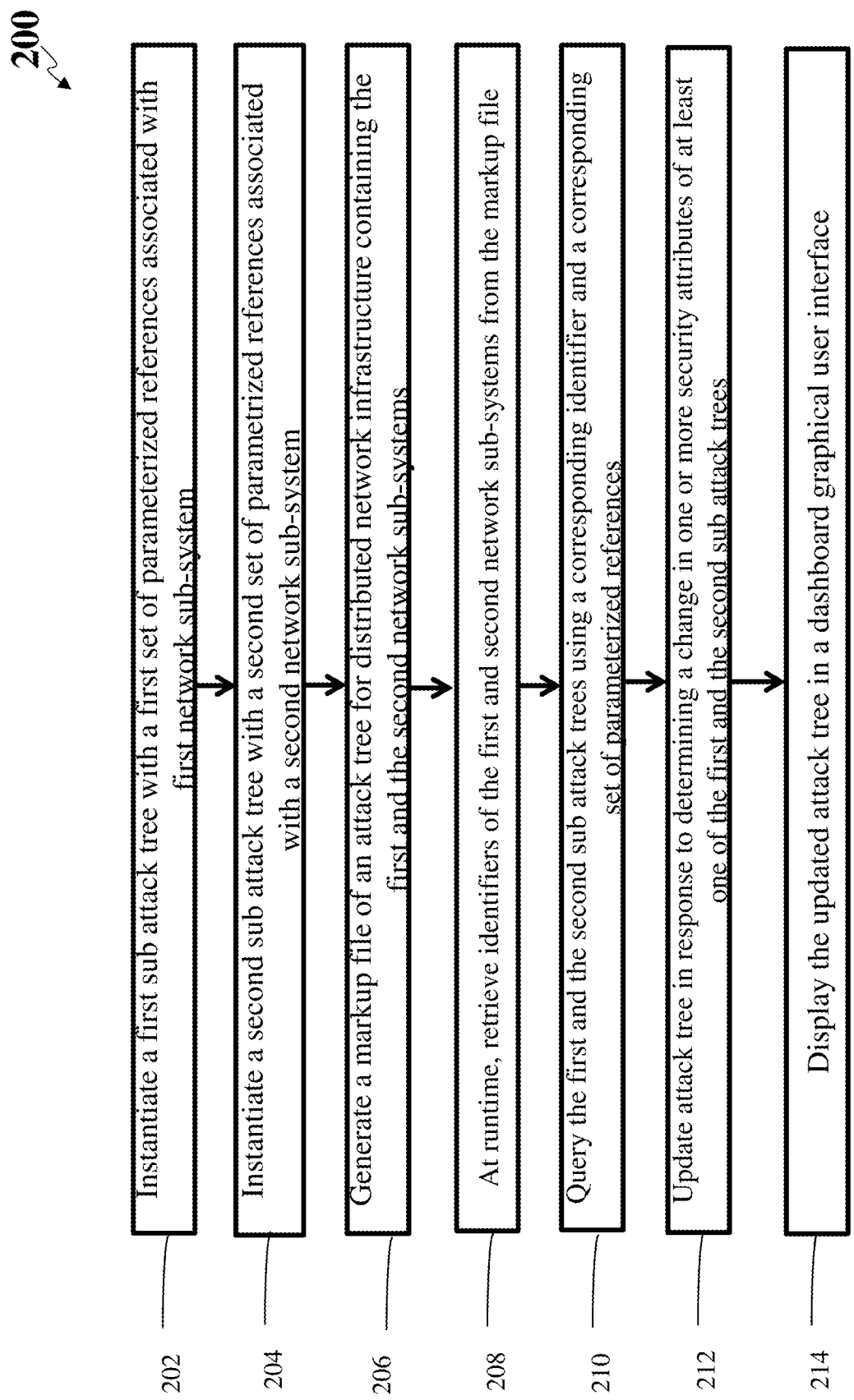
FIG. 2 illustrates a flowchart for improving the cybersecurity of a unified system, according to an embodiment.

FIG. 2 illustrates a flowchart 200 for improving the cybersecurity of a unified system, according to an embodiment. Other embodiments may comprise additional or alternative steps, or may omit some steps altogether.

At step 202, the analytic server may instantiate a first sub attack tree with a first set of parameterized references associated with a first network sub-system. A unified system may be a distributed network infrastructure comprising a plurality of network sub-systems. The plurality of network sub-systems may be owned by different entities. For example, a first entity may own the first network sub-system. A second entity may own a second network sub-system. The analytic server may instantiate a sub attack tree for each network sub-system within the distributed network infrastructure.

Specifically, for a first network sub-system, the analytic server may instantiate the first sub attack tree based on attack detection rules, metadata, various attributes of the first network sub-system. The attack tree may be an executable logic for detecting attacks. The attack detection rules, metadata, various attributes may be from user configuration and/or local knowledge in a local database associated with the first network sub-system. Based on the attack detection rules, the analytic server may generate the first sub attack tree that shows how the first sub-system can be attacked, and describes threats on the first sub-system and possible attacks to realize those threats. The analyst server may be able to associate different metadata, various attributes from the user configuration and/or local knowledge on the first network sub-system with items of the first sub attack tree and test the systems in various ways.

The analytic server may instantiate the first sub attack tree with a first set of parameterized references. The first set of parameterized references may be a set of parameters available for the first sub attack tree to execute the logic to detect attacks. The analytic server may generate the first sub attack tree based on a template. The template may take the attack detection rules, metadata, various attributes from user configuration and/or local knowledge as input and output an attack tree. In some embodiments, the first network sub-system may generate its own sub attack tree. The sub attack tree may be stored in the first network sub-system.

At step 204, the analytic server may instantiate a second sub attack tree with a second set of parameterized references associated with a second network sub-system. As discussed above, a distributed network infrastructure (e.g., unified system) may comprise a plurality of network sub-systems. Each network sub-system may have its own sub attack tree to monitor the sub-system and analyze security threats and attacks. For a second network sub-system, the analytic server may instantiate a second sub attack tree based on attack detection rules, metadata, various attributes of the second network sub-system. The attack detection rules, metadata, various attributes may be from user configuration and/or local knowledge in a local database associated with the second network sub-system. Based on the attack detection rules, the analytic server may generate the second sub attack tree that shows how the second sub-system can be attacked, and describes threats on the second sub-system and possible attacks to realize those threats. The analyst server may be able to associate different metadata, various attributes from the user configuration and/or local knowledge on the second network sub-system with items of the second sub attack tree and test the systems in various ways.

The analytic server may instantiate the second sub attack tree with a second set of parameterized references. The second set of parameterized references may be a set of parameters available for the second sub attack tree to execute the logic to detect attacks. The analytic server may generate the second sub attack tree based on a template. The template may take the attack detection rules, metadata, various attributes from user configuration and/or local knowledge as input and output an attack tree. In some embodiments, the second network sub-system may generate its own sub attack tree. The sub attack tree may be stored in the second network sub-system. The analytic server may perform the process discussed above to instantiate a sub attack tree for each network sub-system within the distributed network infrastructure (e.g., unified system).

At step 206, the analytic server may generate a machine-readable markup file of an attack tree for the distributed network infrastructure (e.g., unified system) containing the first and second network sub-systems. The markup file may be an Extensible Markup Language file. The markup file may contain identifiers of the plurality of network sub-systems including a first identifier of the first network sub-system and a second identifier of the second network sub-system. The analytic server may manage the security of the distributed network infrastructure. The attack tree for the distributed network infrastructure may comprise the sub attack tree of each network sub-system (including the first and second network sub-systems) within the distributed network infrastructure. The analytic server may generate the machine-readable markup file to record the identifier of each sub attack tree. The identifier of each sub attack tree may be URL or URI.

At step 208, the analytic server may retrieve identifiers of the first and second network sub-systems from the markup file at runtime. When the analytic server manages the security of the distributed network infrastructure, the analytic server may need to access the sub attack tree of each network sub-system. The analytic server may access the markup file to retrieve the identifiers of the sub attack trees of the network sub-systems (including the first and second network sub-systems) within the distributed network infrastructure. The identifiers may be the URL or URI.

At step 210, the analytic server may query the first and the second sub attack trees using a corresponding identifier and a corresponding set of parameterized references at runtime. Based on the identifier (e.g., URL or URI) of each sub attack tree, the analytic server may be able to access the sub attack tree for each network sub-system and the corresponding set of parameterized references.

In operation, when the analytic server traverses the attack tree of the distributed network infrastructure at runtime, the analytic server may reach a portion of the attack tree that is a reference to a sub attack tree of a network sub-system. The reference may be a URL or URI. The analytic server may access or refer to the sub attack tree based on the identifier (e.g., URL or URI) at runtime. Furthermore, the analytic server may generate a set of parameters (e.g. parameterized references) based on security analysis from traversing the attack tree, while refer to the sub attack tree. When the analytic server refers to the sub attack tree, the analytic server may transmit the set of parameters to the sub attack tree. Sequentially, the sub attack tree may execute the logic for detecting attacks based on the set of parameters.

In some embodiments, the analytic server may transmit a set of authentication parameters to the sub-systems to query the sub attack trees. For example, the analytic server may transmit a first set of authentication parameters to the first sub-system to query the first sub attack tree. The first set of authentication parameters may authenticate the analytic server with the first sub-system. The analytic server may transmit a second set of authentication parameters to the second sub-system to query the first sub attack tree. The second set of authentication parameters may authenticate the analytic server with the second sub-system.

At step 212, the analytic server may update attack tree in response to determining a change in one or more security attributes of at least one of the first and the second sub attack trees. The change in the one or more security attributes may be based upon the interconnection between the first network sub-system and the second network sub-system. The analytic server may automatically update at least one node in the attack tree hierarchically above the first and second sub attack trees, in response to determining that one or more security attributes of both of the first and the second sub attack trees have changed. After the analytic server updates the attack tree of the unified system, the analytic server may generate a report document based upon the updating of at least one node in the attack tree.

In operation, the analytic server may aggregate the plurality of sub attack trees of the network sub-systems to build an attack tree for the distributed network infrastructure (e.g., unified system). The analytic server may determine how the aggregation of the plurality of network sub-systems may affect the unified system security. Emergent vulnerabilities may appear due to aggregation of specific pairs of sub-systems. A particular sub-system may impart crosscutting concerns on all other sub-systems. Another pairwise combination may result in a "cross product" of model sub-trees.

The analytic server may build the attack tree based on a set of aggregation rules and other attack detection rules, which dictate how various metrics are computed in terms of lower-level data. The analytic server may support a large set of aggregation functions and attack detection rules. The analytic server may determine how the interconnection of the plurality of network sub-systems may affect the unified system security. For example, while the first and second network sub-systems are each secure locally, the analytic server may determine the security threats produced by the interconnection of the first and second network sub-systems. The analytic server may also determine any changes in one or more security attributes of the first and second network sub-systems and the unified system. The analytic server may automatically update one or more nodes in the attack tree to reflect the changes.

The analytic server may use aggregation functions to define how metrics at a single level of the sub attack tree are computed in terms of metrics from the next level down. While the unified system allows arbitrary aggregation functions to be defined, the analytic server may provide support for customizing the user interface to facilitate the definition of aggregation rules common in real-time intrusion alert systems. These rules may serve to correlate sensor data from servers, endpoints, network devices, and existing IDS in a mission/system-specific manner. Such a feature may give added value to the unified system's models: by knowing the context of an alert, the system may compute the impact to overall mission success.

The analytic server may implement import tools to reduce the barriers to creating a system-wide cybersecurity model (e.g., the attack tree of the distributed network infrastructure). The import tools may provide system architecture description files including architecture/interconnection diagram, software inventory list, and vulnerability scan report of the network sub-systems. The analytic server may parse the imported specific file and produce a partial or complete attack tree from the file.

At step 214, the analytic server may display the updated attack tree in a dashboard graphical user interface (GUI). The analytic server may update the attack tree of the unified system based on the changes and the aggregated impacts produced by the interconnection of the sub-systems. For example, the interconnection between the first and the second sub attack trees may result in changes of one or more security attributes in a higher level (above the first and second sub attack trees). The analytic server may automatically update one or more nodes in the attack tree in the higher-level to reflect the changes. The analytic server may display the updated attack tree in a dashboard graphical user interface.

In some embodiments, the analytic server may provide a graphical user interface for the analyst/user to define customer functions and rules for managing the attack tree. By interacting with the user interface, the analyst may be able to associate different metadata, various attributes with items of the attack tree and test the systems in various ways. In some other embodiments, the analytic server may retrieve the functions and rules from the local knowledge database. Based on the aggregation rules and attack detection rules, the analytic server may generate the attack tree that shows how a large system can be attacked, and describes threats on computer systems and possible attacks to realize those threats.

The analytic server may compute aggregate system impact and risk metrics in real-time. The analytic server may correlate context and configuration data from the network sub-systems, disparate servers, endpoints, and network sensors and determine overall system risk of the distributed network infrastructure (e.g., unified system). The analytic server may not only determine if the combination of correlated data indicates an attack, but also how much of an impact the attack might have. For example, the analytic server may determine various security-relevant metrics for the unified system as a whole, such as impact, potential for loss of life, remediation cost, and the like. As data arrives, the analytic server may re-compute the metrics in real-time. The analytic server may develop aggregation modules for the unified system's hierarchical model to compute (or update) impact metrics in terms of lower-level alerts and indicators from server, endpoint, and network sensors or intrusion detection systems. The unified system's hierarchical system model may provide computed scores, such as Common Vulnerability Scoring System (CVSS) scores, to rank indicators and alerts.

The analytic server may monitor systems and receive electronic notifications of alerts from various devices and systems under management in real-time. The analytic server may monitor a set of devices and systems with any number of devices connected with each other within a distributed network. The analytic server may detect attacks while excluding false alarms using the attack tree of the unified system. The analytic server may rank and prioritize the attacks based on an impact score calculated from the impact and risk metrics. The analytic server may generate in real-time reports in standard formats. The analytic server may display the report in a dashboard of a user interface based on the ranking. The dashboard may comprise the prioritized list of the attacks.

Figure 3:
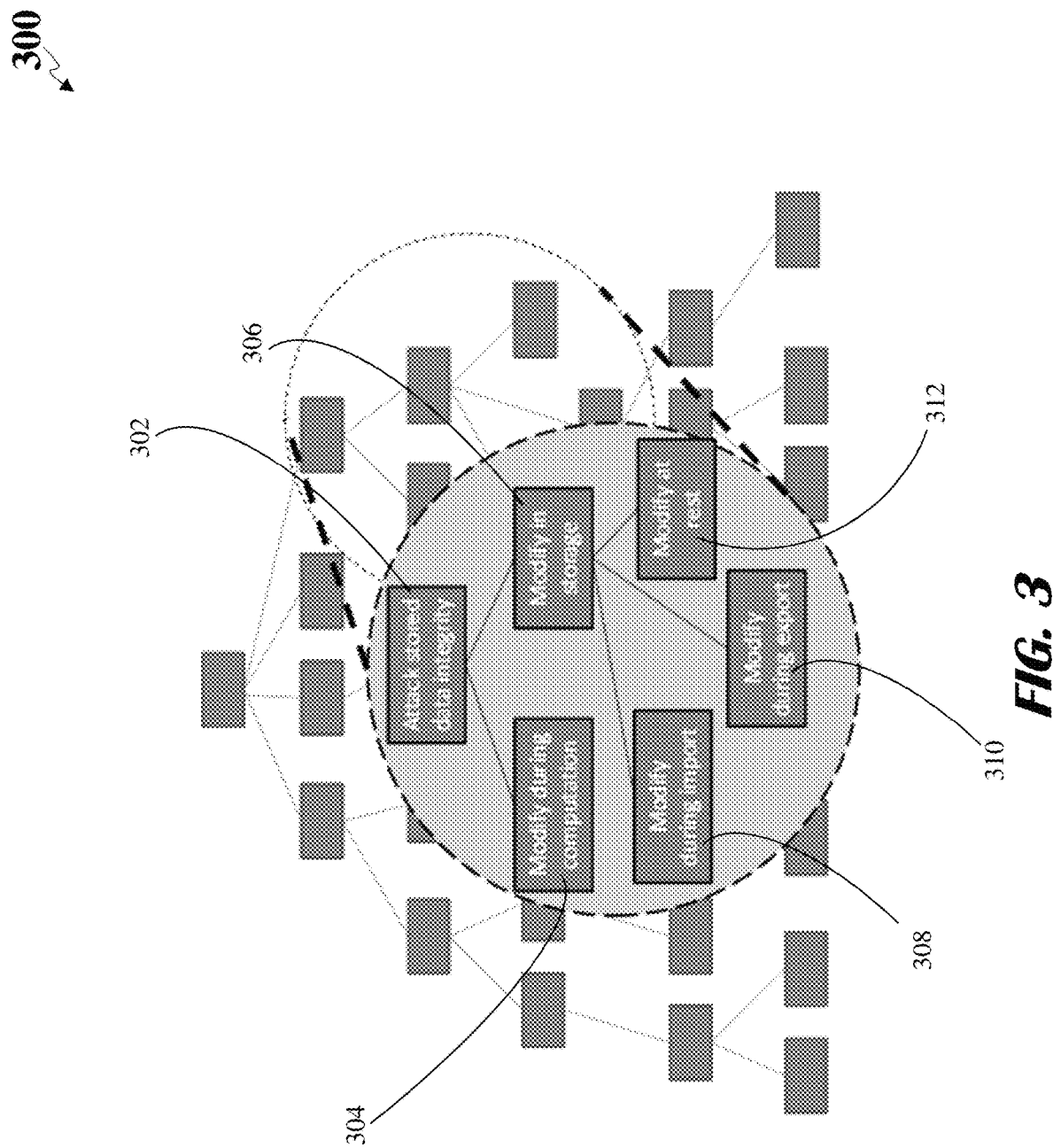
FIG. 3 illustrates an example of an attack tree, according to an embodiment.

FIG. 3 illustrates an example of an attack tree 300, according to an embodiment. The attack tree model may show how an adversary's aims can be achieved in terms of sub-goals and system configuration choices. The attack tree may be a multi-level diagram consisting of one root, leaves, and children. From the bottom up, child nodes are conditions, which must be satisfied to make the direct parent node true; when the root is satisfied, the attack is complete. Each node may be satisfied only by its direct child nodes. A node may be the child of another node; in such a case, it becomes logical that multiple steps must be taken to carry out an attack. FIG. 3 shows an excerpt of a high-level attack tree that describes an attack on data integrity; all children shown in the excerpt may be disjunctive. The attack on data integrity may comprise attack on stored data integrity 302 and attack on other data integrity. The data may be modified either during computation 304 or in persistent storage 306. The stored data may be modified during import 308, during export 310, or when it not being actively used 312. The children of each of these nodes may detail specific ways those modifications could happen.

In operation, the analytic server may monitor the distributed network infrastructure with multiple heterogeneous systems by receiving alerts from external sensors and intrusion detection systems. Based on the logging information, alerts, events received from various devices and systems under management, the analytic server may determine attacks by executing the logic of the attack tree model. The analytic server may follow the logic of the attack tree by traversing the attack tree from bottom up and determine if the logging information, alerts and events data satisfy the operating conditions of the nodes. From the bottom up, child nodes are lower-level operating conditions of an attack, at least one of the child nodes must be satisfied to make the direct parent node true, the parent node may represent higher-level operating condition; when the root is satisfied (e.g., the highest level operating condition is satisfied), the attack is complete. The analytic server may perform automated evaluations and computations over the attack tree, testing on-line to see whether particulate vulnerabilities are present or known-weak configurations or libraries are in use. In addition, by correlating information from multiple sources, the analytic server may be able to learn context for alerts and distinguish likely false alarms, as well as true, but unimportant, alerts. Thus, the analytic server may reduce false positives and cognitive load the false positives may cause.

Figure 4:
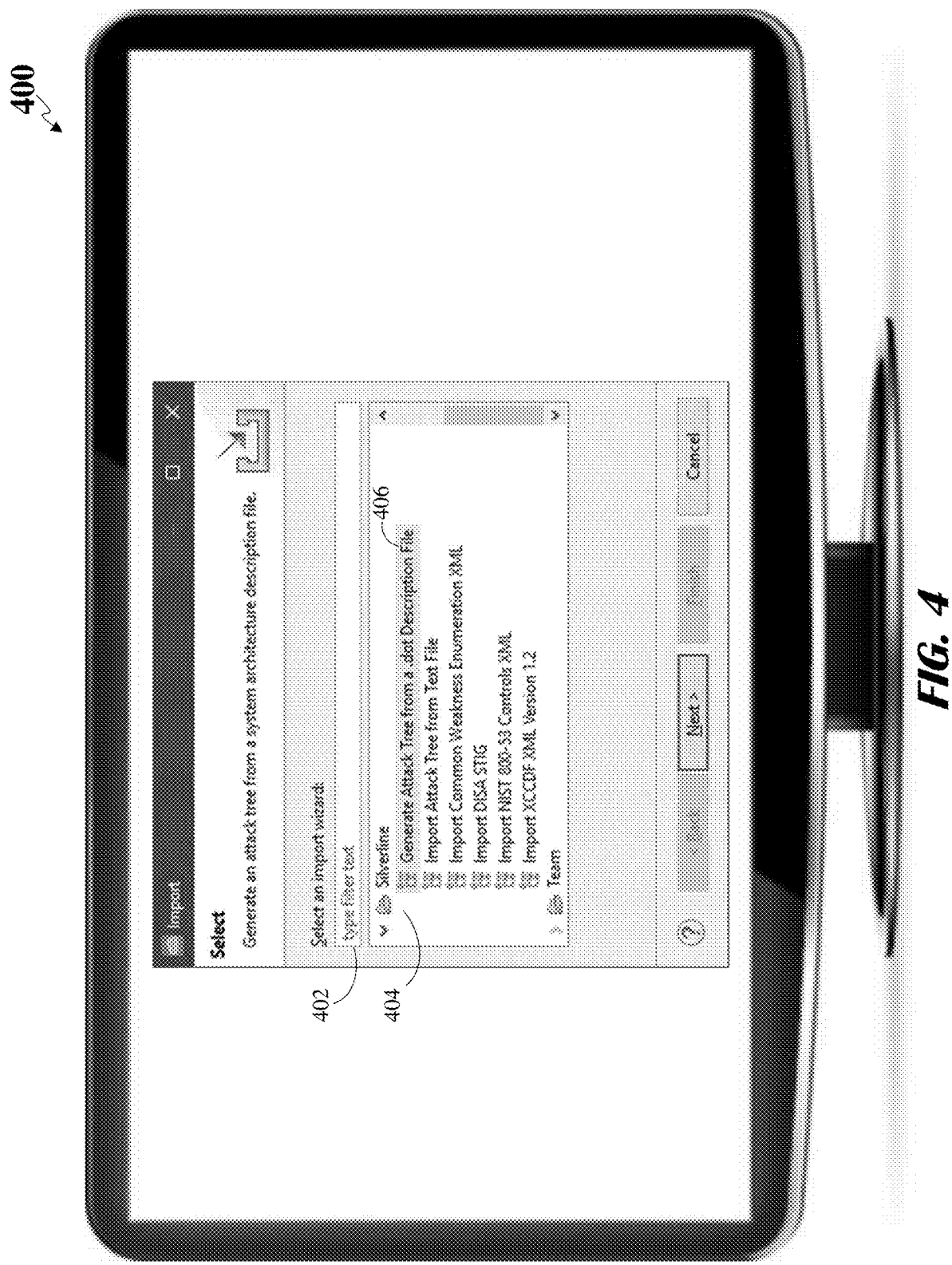
FIG. 4 illustrates an example of a graphical user interface for generating partial or complete attack trees from imported system artifact, according to an embodiment.

FIG. 4 illustrates an example of a graphical user interface 400 for generating partial or complete attack trees from imported system artifact, according to an embodiment. The analytic server may implement import tools to reduce the barriers to creating a system-wide cybersecurity model (e.g., the attack tree of the distributed network infrastructure). The import tools may provide system architecture description files including architecture/interconnection diagram, software inventory list, and vulnerability scan report. The analytic server may parse the imported specific file and produce a partial or complete attack tree model from the file. For example, the analytic server may provide a graphical user interface (GUI) 400 that allows a user to select a system architecture description file to generate an attack tree. The GUI may include a text-based box 402 for the user to input the filter text. The user may input keywords in the text-based box 402 to narrow the scope of the importer files. The GUI 400 may also include a drop-down menu 404 displaying the list of importer files matching the user's keywords. For instance, the user may import a rudimentary system architecture diagram in GraphViz's .dot format by selecting a corresponding file 406 in the list. The imported file may describe the data flows between components of the system architecture. The analytic server may parse the imported file and generate attack tree models based on the data flows. The analytic server may also import established guidance, Security Content Automation Protocol standards, and commercial or open source equivalents. The analytic server may generate partial or complete attack trees based on the artifacts from the imported files.

Figure 5:
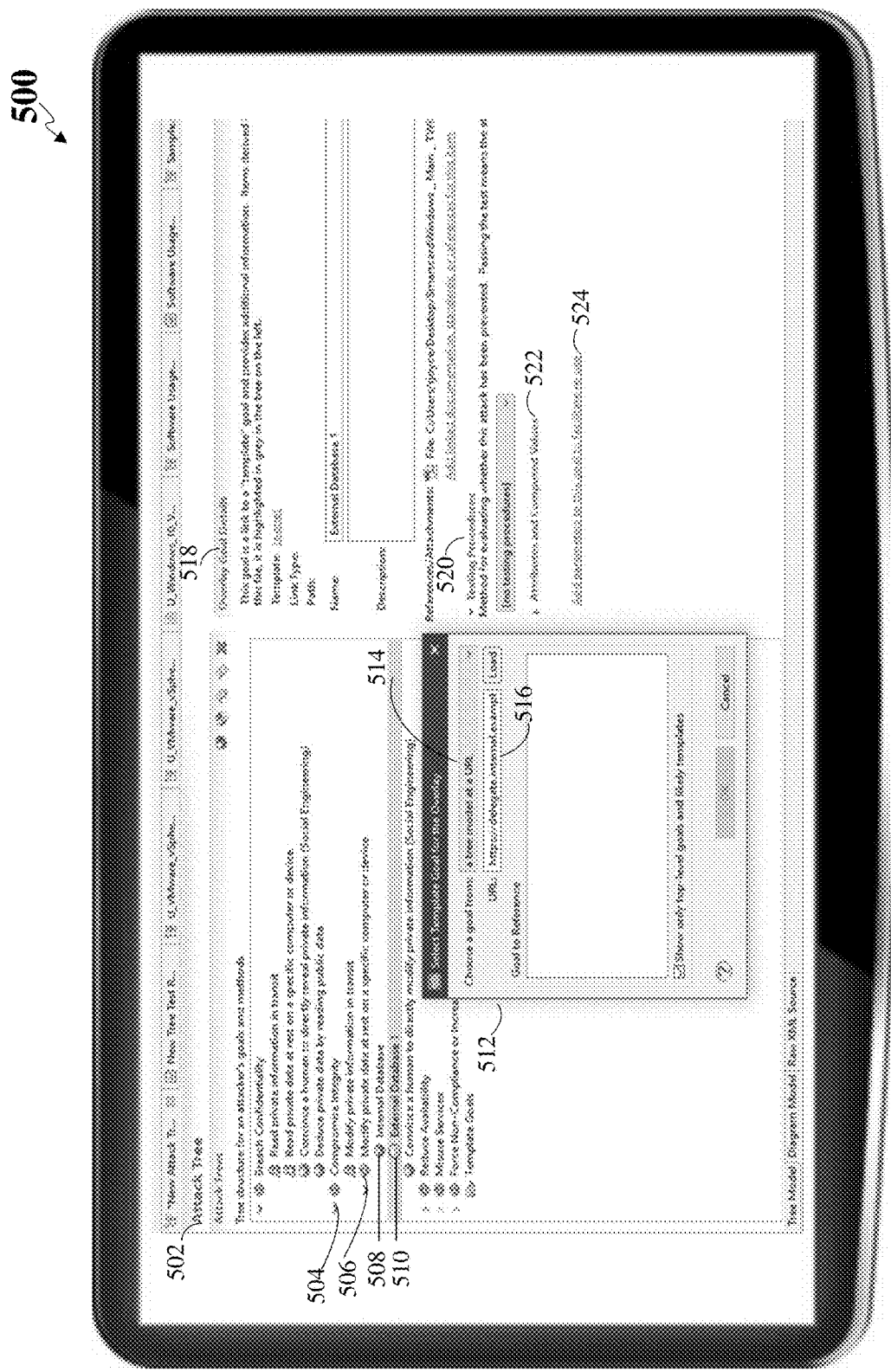
FIG. 5 illustrates an example of a graphical user interface for an attack tree referring to sub attack trees, according to an embodiment.

FIG. 5 illustrates an example of a graphical user interface 500 for an attack tree referring to sub attack trees, according to an embodiment. The analytic server may support distributed models, where a high-level model may make reference to multiple sub-system models maintained by others. For example, the attack tree of the unified system may make reference to sub attack trees of the plurality of sub-systems. The analytic server may refer to the sub attack trees as files or via URL. References may add annotation, extra document, or override attributes of referred-to components. References may also make structural modification to the referred-to attack tree models when appropriate via a set of parameters (e.g., to add new attack vectors that are only relevant in a specific context).

As shown in FIG. 5, the attack tree 502 may comprise breach confidentiality, compromised integrity, reduce availability, misuse services, force non-compliance or increase liability, etc. Although the attack trees are in a directory structure, the system may also show a traditional boxes-and-arrows tree diagram, similar to FIG. 3. In the example of the compromise integrity 504, compromise integrity 504 may comprise modifying private data at rest on a specific computer or device 506, which may further comprise internal database 508 and external database 510. For compromise integrity within the external database, the attack tree 502 may refer to a sub attack tree. The analytic server may provide a dialog box 512 that allows the user to choose a sub attack tree for detecting integrity compromise within the external database 510. The dialog box 512 may include a drop-down menu 514 for the user to choose a tree model at a file or at a URL. In this particular example, the user may choose a tree model from at a URL. The dialog box 512 may also include a text-based interface 516 for the user to load the URL.

In order to make it possible to model large systems, the analytic server may use templates for common things that occur in the attack trees. The template may allow an analyst to review and configure the related information. The analytic server may also display the user interface for overlay goal details 518. The displayed overlay goal details 520 may comprise various information about the template including template identifier, link type, path, name, and description. The overlay goal details 518 may also comprise user interfaces of testing procedures 520, attributes and computed values 522, parameter values 524. By interacting with such user interfaces, the analyst may be able to associate different metadata, various attributes with items of the attack tree and test the systems in various ways.

Figure 6:
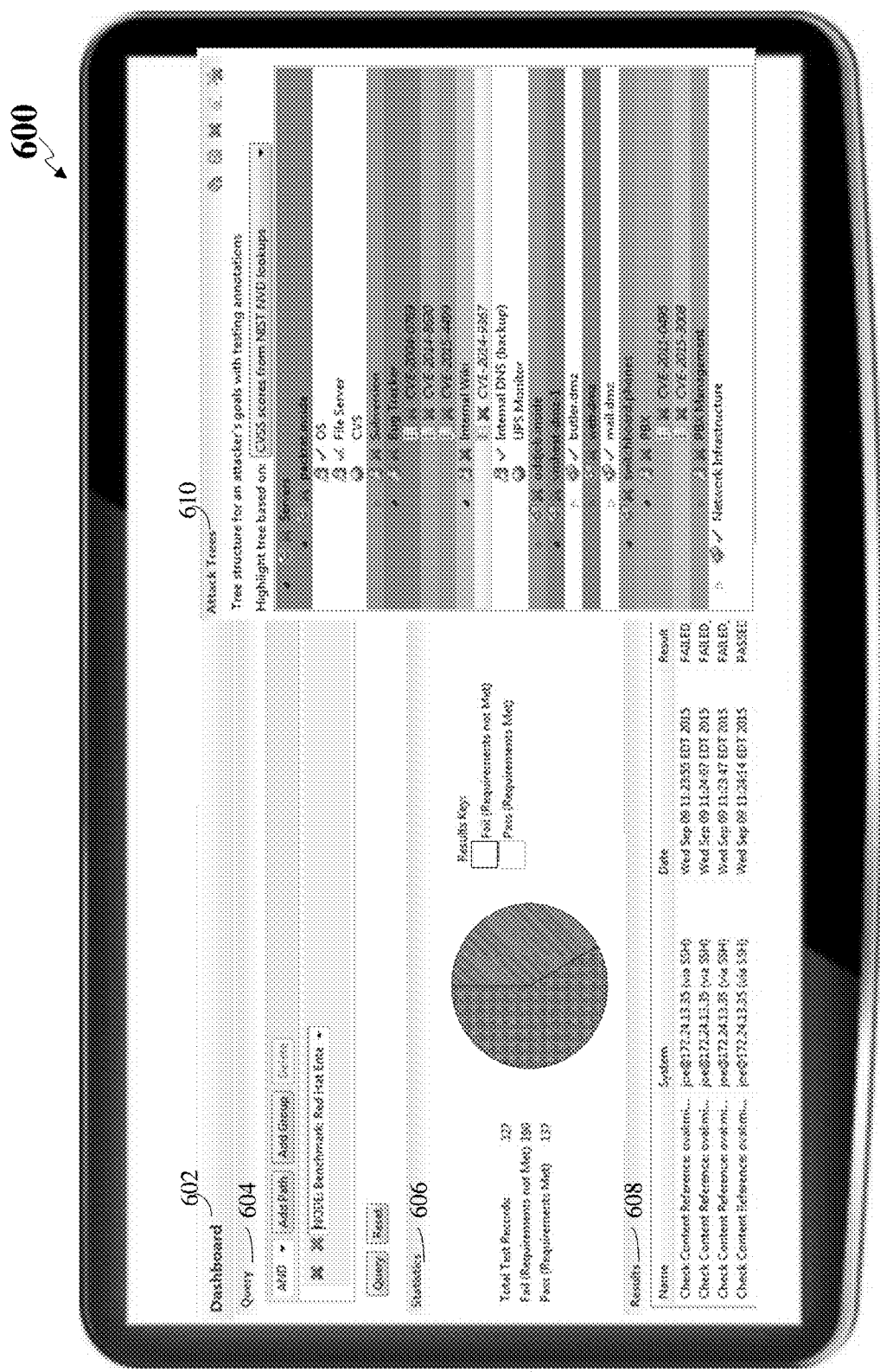
FIG. 6 illustrates an example of a graphical user interface for test records and attack reports, according to an embodiment.

FIG. 6 illustrates an example of a graphical user interface 600 for test records and attack reports, according to an embodiment. The graphical user interface for test records may include a dashboard 602 that displays the elements of query 604, statistics 606, and results 608. The element of query 604 may allow the analyst to issue a specific test query. The element of statistics 606 may display the test result statistics, such as the total test records, failed records, and pass records. The element of results 608 may display detailed test information on each record, such as the name, system, date, and test result (e.g., failed or passed). The graphical user interface for attack reports may display the attack report as attack trees 610. For example, the attack reports may be in a tree structure with highlighted items based on the CVSS scores. In some embodiments, the analytic server may highlight the attacks or threats with different colors based on the CVSS scores. For example, attacks or threats with high CVSS scores may be highlighted in a red warning, attacks and threats with medium CVSS scores may be highlighted in an orange warning, and attacks and threats with low CVSS scores may be highlighted in a yellow warning.

The analytic server may rank and prioritize the attacks based on an impact score calculated from the impact and risk metrics and display the attacks based on the ranking. After determining a set of impact and risk metrics from multiple data sources, the analytic server may calculate aggregated metrics (e.g., CVSS vectors) from base data. For example, the analytic server may calculate an impact score (e.g., CVSS score) based on the impact and risk metrics. The CVSS is a free and open industry standard for assessing the severity of computer system security vulnerabilities. CVSS attempts to assign severity scores to vulnerabilities, allowing responders to prioritize responses and resources according to threat. Scores are calculated based on a formula that depends on several metrics that approximate ease of exploit and the impact of exploit.

The analytic server may rank attack indicators and alerts based on the CVSS scores and display the attacks on a user interface based on the ranking. The analytic server may show the context and impacts of alert on the user interface. As a result, the analyst may easily see which alters have the most significant "big picture" impact and which can be triaged for later assessment by low-level personnel. When cost or other metrics are available, the analyst can easily see which proposed remediation strategies have the most significant impact for the least cost or least mission disruption. Thus, the system may help triage unimportant issues from critical ones, save time and mental effort by subject matter experts (SME), maximize the effectiveness of limited SME time in real-time monitoring high value IT assets.

The analytic server may support visualization and Portable Document Format (PDF) report-generation capabilities in the security system. FIG. 6 illustrates an example of a user interface for test records and attack reports. The analytic server may support generating alters via syslog, email, and STIX+TAXII (Structured Threat Information Expression+ Trusted Automated Exchange of Indicator Information) when analyst-defined conditions occur (e.g., a high-impact attack found with a particular likelihood). In responding to alerts, the analyst may bring up their copy of a security application to examine visualizations or drill deeper into the indicators of compromise. Email alerts may include a PDF report with detailed visualizations as an attachment. These alerts may occur in real-time, as data comes in and computed metrics exceed thresholds.

As with data importers, the analytic server may define a plug-in application programming interface (API) for generating alerts in arbitrary formats. The API may also be used to perform automated remediation or other actions in response to a suitably severe alert; the API may provide the automated response algorithm with information on the expected impact or disruption, both of which are critical in deciding whether to take automated action. In some embodiments, the analytic server may automatically respond to one or more higher priority attacks. As a result, the analytic server may lay the groundwork for automated response.

Internally, the analytic server may use straightforward Extensible Markup Language (XML) for data storage and processing and keep raw data in its native formats for forensic purposes. By combining such features, the analytic server may facilitate integration with other data processing tools. For instance, one could write an Extensible Stylesheet Language Transformations (XSLT) script that generates Hypertext Markup Language (HTML) reports from the security system test records.

In a non-limiting example, the analytic server may manage the cybersecurity of a big company, which has a unified system comprising ten sub-systems. The ten sub-systems may be owned by different departments and located in different locations. The analytic server may build a high-level attack tree by aggregating the ten sub attack trees of the sub-systems. In the aggregation process, the analytic server may determine how the interconnection of the ten sub-systems may affect the unified system security. The analytic server may monitor systems and receive electronic notifications of alerts from various devices and systems under management in real-time. The analytic server may detect attacks by traversing the attack tree of the unified system. When the analytic server traverses the attack tree of the unified system, the analytic server may reach a portion of the attack tree that is a reference to a sub attack tree of a sub-system. The reference may be a URL or URI. The analytic server may access or refer to the sub attack tree based on the URL or URI. The analytic server may determine attacks by executing the logic of the attack tree model. The analytic server may generate an electronic document for attack reports and display the reports in a dashboard GUI.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
instantiating, by a computer, a first sub attack tree with a first set of parameterized references associated with a first network sub-system in a distributed network infrastructure;
instantiating, by the computer, a second sub attack tree with a second set of parameterized references associated with a second network sub-system in the distributed network infrastructure, the computer instantiating the first and second sub attack trees based on a sub attack tree template;
generating, by the computer, a machine readable markup file of an attack tree of the distributed network infrastructure containing a plurality of network sub-systems including the first and second network sub-systems, the attack tree containing the first and second sub attack trees, and the markup file containing identifiers of the plurality of network sub-systems including a first identifier of the first network sub-system and a second identifier of the second network sub-system;
retrieving, by the computer at runtime, the first identifier and the second identifier from the machine readable markup file;
querying, by the computer at runtime, the first sub attack tree using the first identifier and the first set of parameterized references and the second sub attack tree using the second identifier and the second set of parameterized references; and
in response to the computer determining based upon the query that one or more security attributes of at least one of the first and second sub attack trees have changed:
automatically updating, by the computer, at least one node in the attack tree hierarchically above the first and the second sub attack trees; and
displaying, by the computer, the updated attack tree in a dashboard graphical user interface.

2. The computer-implemented method according to claim 1, wherein the machine readable markup file is an Extensible Markup Language file.

3. The computer-implemented method according to claim 1, wherein the identifiers are Uniform Resource Locators.

4. The computer-implemented method according to claim 1, wherein the identifiers are Uniform Resource Identifiers.

5. The computer-implemented method according to claim 1, wherein automatically updating at least one node in the attack tree further comprises:
automatically updating, by the computer, at least one node in the attack tree hierarchically above the first and second sub attack trees in response to the computer determining that one or more security attributes of both of the first and the second sub attack trees have changed.

6. The computer-implemented method according to claim 1, further comprising:
generating, by the computer, a report document based upon the updating at least one node in the attack tree.

7. The computer-implemented method according to claim 1, wherein the first network sub-system is owned by a first entity and the second network sub-system is owned by a second entity.

8. The computer-implemented method according to claim 1, wherein the first sub attack tree is stored in the first network sub-system and the second sub attack tree is stored in the second network sub-system.

9. The computer-implemented method according to claim 1, further comprising:
transmitting, by the computer, a first set of authentication parameters to the first network sub-system to query the first sub attack tree, wherein the first set of authentication parameters authenticate the computer with the first network sub-system; and
transmitting, by the computer, a second set of authentication parameters to the second network sub-system to query the second sub attack tree, wherein the second set of authentication parameters authenticate the computer with the second network sub-system.

10. The computer-implemented method according to claim 1, wherein the one or more security attributes are based upon interconnection between the first network sub-system and the second network sub-system.

11. A system comprising:
a non-transitory storage medium storing a plurality of computer program instructions; and
a processor electrically coupled to the non-transitory storage medium and configured to execute the plurality of computer program instructions to:
instantiate a first sub attack tree with a first set of parameterized references associated with a first network sub-system in a distributed network infrastructure;
instantiate a second sub attack tree with a second set of parameterized references associated with a second network sub-system in the distributed network infrastructure, the computer instantiating the first and second sub attack trees based on a sub attack tree template;
generate a machine readable markup file of an attack tree of the distributed network infrastructure containing a plurality of network sub-systems including the first and second network sub-systems, the attack tree containing the first and second sub attack trees, and the markup file containing identifiers of the plurality of network sub-systems including a first identifier of the first network sub-system and a second identifier of the second network sub-system;
retrieve, at runtime, the first identifier and the second identifier from the machine readable markup file;
query, at runtime, the first sub attack tree using the first identifier and the first set of parameterized references and the second sub attack tree using the second identifier and the second set of parameterized references;
in response to the processor determining based upon the query that one or more security attributes of at least one of the first and second sub attack trees have changed:
automatically update at least one node in the attack tree hierarchically above the first and the second sub attack trees; and
display the updated attack tree in a dashboard graphical user interface.

12. The system according to claim 11, wherein the machine readable markup file is an Extensible Markup Language file.

13. The system according to claim 11, wherein the identifiers are Uniform Resource Locators.

14. The system according to claim 11, wherein the identifiers are Uniform Resource Identifiers.

15. The system according to claim 11, wherein to automatically update at least one node in the attack tree, the processor is configured to further execute the plurality of computer program instructions to:

automatically update at least one node in the attack tree hierarchically above the first and second sub attack trees in response to the processor determining that one or more security attributes of both of the first and the second sub attack trees have changed.

16. The system according to claim 11, wherein the processor is configured to further execute the plurality of computer program instructions to:
generate a report document based upon the updating at least one node in the attack tree.

17. The system according to claim 11, wherein the first network sub-system is owned by a first entity and the second network sub-system is owned by a second entity.

18. The system according to claim 11, wherein the first sub attack tree is stored in the first network sub-system and the second sub attack tree is stored in the second network sub-system.

19. The system according to claim 11, wherein the processor is configured to further execute the computer program instructions to:
transmit a first set of authentication parameters to the first network sub-system to query the first sub attack tree, wherein the first set of authentication parameters authenticate the computer with the first network sub-system; and
transmit a second set of authentication parameters to the second network sub-system to query the second sub attack tree, wherein the second set of authentication parameters authenticate the computer with the second network sub-system.

20. The system according to claim 11, wherein the one or more security attributes are based upon interconnection between the first network sub-system and the second network sub-system.

* * * * *